June 17, 1930.  J. R. PATRON  1,763,902

FLASH LIGHT

Filed June 13, 1929

INVENTOR
Joaquin R. Patron
BY
ATTORNEY

Patented June 17, 1930

1,763,902

UNITED STATES PATENT OFFICE

JOAQUIN R. PATRON, OF CAMPECHE, MEXICO

FLASH LIGHT

Application filed June 13, 1929. Serial No. 370,701.

This invention relates to new and useful improvements in flash lights.

The invention has for an object the provision of a device of the class mentioned which is of simple durable construction, dependable in use and efficient in action, and which may be manufactured and sold at a reasonable cost.

The invention proposes a flash light with a switch for its operation arranged to be completely removable from the remainder of the flash light so that it may be easily repaired or replaced. Generally, flash lights become worn or damaged due to short circuiting of their switches or to wearing of the switch itself. These switches are customarily constructed fixed within the flash light and are not readily accessible for repair or replacement. Many of the parts constituting the switch which are capable of becoming worn or damaged are permanently fastened and may not be replaced.

A flash light constructed according to this invention necessarily lasts for a longer period of time in that the parts which are likely to become worn are readily accessible for repairing and replacement. Thus if a small part becomes worn it is not necessary to discard the entire flash light.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Figure 1:
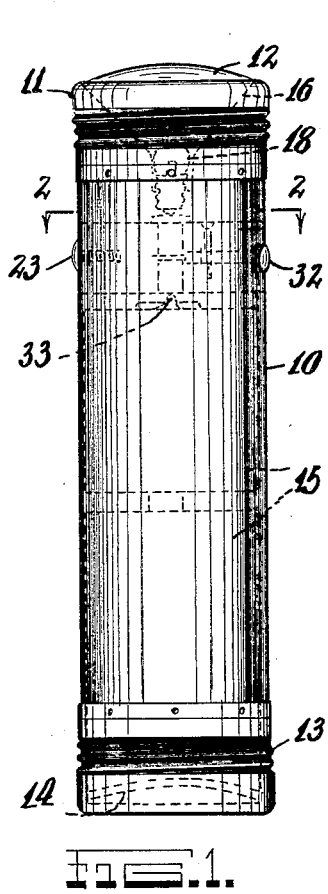
Fig. 1 is a side elevational view of a flash light constructed according to this invention.
Figure 2:
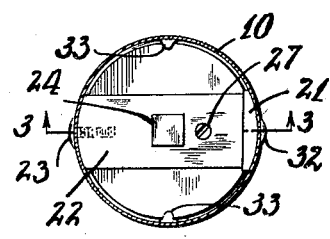
Fig. 2 is a horizontal sectional view taken on the line 2—2 of Fig. 1.
Figure 3:
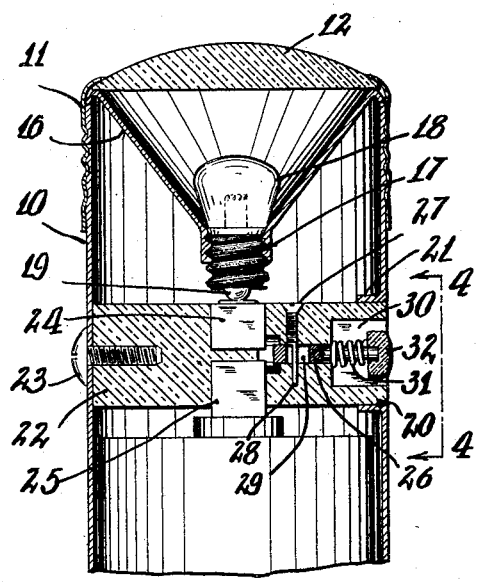
Fig. 3 is a fragmentary enlarged detail sectional view taken on the line 3—3 of Fig. 2.

The reference numeral 10 indicates generally a metallic tubular casing provided at its front end with an end cap 11 threadedly engaged thereon and supporting a magnifying glass 12. A second end cap 13 threadedly engages upon the rear end of the tubular member and this end cap is provided with a spring 14 arranged within the end cap for forcing battery cells such as 15 housed within the tubular casing towards the front.

Directly behind the magnifying glass 12 and attached upon the casing 10 is a reflector 16. This reflector is provided with a socket portion 17 engaged by a lamp 18. The rear central contact of the lamp is indicated by reference numeral 19. The reflector 16 itself constitutes the other connection for the lamp 18, this reflector being an electrical connection with the casing 10.

The casing 10 is formed with a square opening 20 and the material struck-out of this opening is bent rearwards to form flanges 21. An insulation bridge 22 of square shape in transverse cross section is inserted thru the square opening 20 and the outer end of this bridge is supported against lateral displacements of the flanges 21. A screw 23 secures the inner end of the bridge 22 on to the casing 10.

A stationary top contact 24 is embedded within the bridge 22 and communicates with the top of the bridge, and a stationary bottom contact 25 similarly arranged in the bridge is spaced from the said contact 24. The contact 25 projects from the bottom of the bridge. A movable contact rod 26 is slidably arranged in the insulation bridge 22 and in a complete inward position electrically connects the contact 24 and 25. A screw 27 threadedly engages in the bridge and is formed with a bottom flat end 28 engaging within an elongated opening 29 formed in the movable contact rod 26 for limiting the sliding of the contact rod.

The front end of the bridge 22 is formed with a recess 30, and an expansion spring 31 is housed within this recess coaxially on the contact rod and acts against an insulation knob 32 secured on the outer end of the contact rod and against the bridge 22 for normally urging the contact rod outwards. The casing 10 is also formed with struck-out lugs 33 engageable against the top edges of the top battery cell 15 for preventing the spring 14 from too forcefully urging the battery cell against the bottom contact 25 and probably hurting the bridge.

Figure 5:
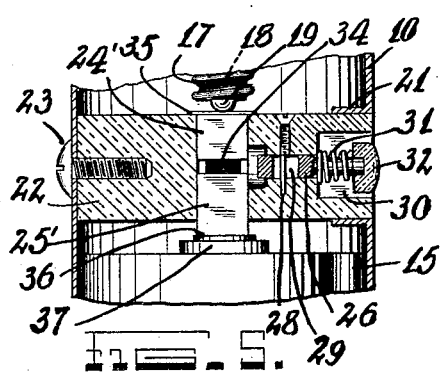
Fig. 5 is a fragmentary view of a portion of Fig. 3 but illustrating a device constructed according to modified form.
Figure 4:
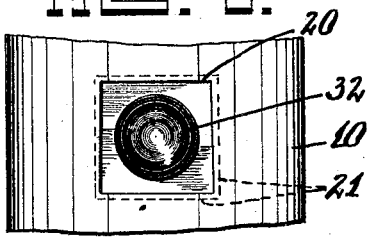
Fig. 4 is a fragmentary side elevational view looking in the direction of the arrows 4—4 of Fig. 3.

In the modified form of the device illustrated in Fig. 5, a bridge 22 has been illustrated provided with a top contact 24' and a bottom contact 25' slidably mounted in the bridge and connected by an insulation connector 34. A flange 35 is formed upon the top of the contact 24' and a similar flange 36 upon the bottom of the contact 25'. The battery cells 15 are forced upwards by the spring 14 so that the top terminal 37 acts against the flange 36 forcing the contacts 25', 24' upwards against the central contact 19 of the lamp 18. This arrangement insures good connections for the proper passage of current. The movable contact rod 26 should be so arranged that upon being moved inwards electrical connection is made between the contacts 24' and 25' irrespective of the position of these contacts.

The cells 15 are formed with insulation material around their peripheries so as not to short circuit with the casing 10. An electrical circuit exists from the cells 15 which are connected in series to the bottom contact of the bridge 22 and upon depression of the knob 32, thru the contact rod 26 to the top contact of the bridge 22, then the central contact 19 of the lamp, next continuing along the reflector 16 to the casing 10, the end cap 13 and finally the spring 14 back to the battery cells.

In operation, it is only necessary to depress the knob 32 for lighting the flash light. Should any of the parts become worn, they are readily accessible, that is for example, the screw 23 may be removed and the bridge 22 with its parts completely removed from the aperture 20. This permits easy repairing of any of the parts held by the bridge. Screw 27 may be removed for a removal of the movable contact rod 26 in the event that the spring 31 or the contact rod itself needs repairing.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A flash light, comprising a casing supporting a lamp socket and formed with a side opening, flanges surrounding said opening, an insulation bridge within the casing and secured at its inner end to the casing by a screw having its head on the outer side of the casing, the front end of the bridge being supported by said flanges, and a switch mounted on the bridge and operable by a knob on the outer end of the bridge and arranged to complete a circuit from battery cells engaged within said casing thru a lamp engaged in said lamp socket.

2. A flash light, comprising a casing provided with a reflector having a lamp socket and formed with a side opening, an insulation bridge within the casing and secured at its inner end to the casing by a screw having its head on the outer side of the casing, the front end of the bridge being supported within said casing opening, and a switch mounted on the bridge and operable by a knob on the outer end of the bridge and arranged to complete a circuit from battery cells engaged within said casing thru a lamp engaged in said lamp socket.

3. A flash light, comprising a casing provided with a reflector having a lamp socket formed with a side opening, flanges surrounding said opening, an insulation bridge within the casing and secured at its inner end to the casing by a screw having its head on the outer side of the casing, the front end of the bridge being supported by said flanges, and a switch mounted on the bridge and operable by a knob accessible from the outside and arranged to complete a circuit from battery cells engaged within said casing thru a lamp engaged in said lamp socket.

4. A flash light, comprising a casing provided with a reflector having a lamp socket and formed with a side opening, flanges surrounding said opening, an insulation bridge within the casing and secured at its inner end to the casing by a screw having its head on the outer side of the casing, the front end of the bridge being supported by said flanges, and a switch mounted on the bridge and operable by a knob on the outer end of the bridge and arranged to complete a circuit from battery cells engaged within said casing thru a lamp engaged in said lamp socket, said switch consisting of spaced top and bottom contacts, and a movable contact rod normally urged outwards and depressible for connecting the contacts.

5. A flash light, comprising a casing provided with a reflector having a lamp socket and formed with a side opening, flanges surrounding said opening, an insulation bridge within the casing and secured at its inner end to the casing by a screw having its head on the outer side of the casing, the front end of the bridge being supported by said flanges, and a switch mounted on the bridge and operable by a knob on the outer end of the bridge and arranged to complete a circuit from battery cells engaged within said casing thru a lamp engaged in said lamp socket, said switch consisting of top and bottom contacts rigidly connected and slidably arranged, and a movable contact rod normally urged outwards and depressible for connecting the top and bottom contacts.

In testimony whereof I have affixed my signature.

JOAQUIN R. PATRON.